US012644818B2

(12) United States Patent　　　　(10) Patent No.:　US 12,644,818 B2

Grosshans　　　　　　　　　　　　(45) Date of Patent:　　Jun. 2, 2026

(54) METHOD FOR DETERMINING AT LEAST ONE CHARGE CHARACTERISTIC OF ELECTRICAL CHARGES OF PARTICLES IN A FLUID STREAM AND A FLUID STREAM CHARGE MEASURING DEVICE

(71) Applicant: BUNDESREPUBLIK DEUTSCHLAND, VERTRETEN DURCH DAS BUNDESMINISTERIUM FÜR WIRTSCHAFT UND ENERGIE, Braunschweig (DE)

(72) Inventor: Holger Grosshans, Braunschweig (DE)

(73) Assignee: BUNDESREPUBLIK DEUTSCHLAND, VERTRETEN DURCH DAS BUNDESMINISTERIUM FÜR WIRTSCHAFT UND ENERGIE, Braunschweig (DE)

( * ) Notice: Subject to any disclaimer, the term of this patent is extended or adjusted under 35 U.S.C. 154(b) by 405 days.

(21) Appl. No.: 18/259,162

(22) PCT Filed: Jan. 11, 2022

(86) PCT No.: PCT/EP2022/050386
§ 371 (c)(1),
(2) Date: Jun. 23, 2023

(87) PCT Pub. No.: WO2022/157033
PCT Pub. Date: Jul. 28, 2022

(65) Prior Publication Data
US 2024/0053251 A1　　Feb. 15, 2024

(30) Foreign Application Priority Data

Jan. 22, 2021　(DE) ..................... 10 2021 101 409.3

(51) Int. Cl.
*G01N 15/1433*　　(2024.01)
*G01N 15/00*　　(2024.01)
(Continued)

(52) U.S. Cl.
CPC ..... *G01N 15/1433* (2024.01); *G01N 15/1031* (2013.01); *G01N 15/1434* (2013.01);
(Continued)

(58) Field of Classification Search
CPC ........... G01N 15/1433; G01N 15/1031; G01N 15/1434; G01N 15/1459;
(Continued)

(56) References Cited

U.S. PATENT DOCUMENTS

| 6,049,382 A | 4/2000 | Lazaro Gomez |
| 8,470,151 B2 | 6/2013 | Liu et al. |
| 2020/0182671 A1* | 6/2020 | Wilke ................... G01F 1/7086 |

FOREIGN PATENT DOCUMENTS

| CN | 109307809 A　* | 2/2019 | ............. G01R 29/14 |
| EP | 3 431 264 B1 | 3/2020 | |
(Continued)

OTHER PUBLICATIONS

Zade, Sagar, et al. "Experimental investigation of turbulent suspensions of spherical particles in a square duct." Journal of fluid mechanics 857 (2018): 748-783. (Year: 2018).*
(Continued)

*Primary Examiner* — Sumati Lefkowitz
*Assistant Examiner* — Ryan P Potts
(74) *Attorney, Agent, or Firm* — WCF IP

(57)　　　　　ABSTRACT

A method for determining a charge characteristic of electrical charges of particles in a fluid stream includes directing the fluid stream containing particles through a fluid line. Then a spatially-resolved determination of a measuring field-less particle velocity in a measurement area without an
(Continued)

electrical measuring field is performed. An electrical measuring field is applied transverse to the flow direction in the measurement area. A spatially-resolved determination of a midfield particle velocity in the measurement area is determined. At least one charge characteristic which denotes an electrostatic charge of the particles is determined from the spatially-resolved particle velocities.

14 Claims, 1 Drawing Sheet

(51) Int. Cl.

| | |
|---|---|
| *G01N 15/10* | (2024.01) |
| *G01N 15/1031* | (2024.01) |
| *G01N 15/14* | (2024.01) |
| *G01N 15/1434* | (2024.01) |
| *G01P 5/20* | (2006.01) |

(52) U.S. Cl.

CPC .......... *G01N 15/1459* (2013.01); *G01P 5/20* (2013.01); *G01N 2015/0003* (2013.01); *G01N 2015/0046* (2013.01); *G01N 2015/0053* (2013.01); *G01N 2015/1027* (2024.01); *G01N 2015/145* (2013.01)

(58) Field of Classification Search

CPC ... G01N 2015/0003; G01N 2015/0046; G01N 2015/0053; G01N 2015/1027; G01N 2015/145; G01P 5/20

See application file for complete search history.

(56) References Cited

FOREIGN PATENT DOCUMENTS

| | | |
|---|---|---|
| JP | 2015-102386 A | 6/2015 |
| WO | 2014/106078 A2 | 7/2014 |
| WO | WO-2021005396 A1 * | 1/2021 .......... G01N 27/447 |

OTHER PUBLICATIONS

Grosshans, Holger, et al. "Influence of electrostatic charges on the particle concentration in wall-bounded turbulent flows." 8th World Congress on Particle Technology, Orlando, FL, USA. 2018. (Year: 2018).*

Grosshans, Holger, and Miltiadis V. Papalexandris. "Large eddy simulation of triboelectric charging in pneumatic powder transport." Powder Technology 301 (2016): 1008-1015. (Year: 2016).*

Grosshans, Holger, and Miltiadis V. Papalexandris. "Numerical study of the influence of the powder and pipe properties on electrical charging during pneumatic conveying." Powder Technology 315 (2017): 227-235. (Year: 2017).*

Ceresiat, Lise, Holger Grosshans, and Miltiadis V. Papalexandris. "Powder electrification during pneumatic transport: The role of the particle properties and flow rates." Journal of Loss Prevention in the Process Industries 58 (2019): 60-69. (Year: 2019).*

Bissinger, Claus, and Holger Grosshans. "A new computational algorithm for the interaction between electrically charged particles." SN Applied Sciences 2.5 (2020): 965. (Year: 2020).*

Grosshans et al: "Exploring the mechanism of inter-particle charge diffusion", The European Physical Journal Applied Physics, vol. 82, May 3, 2018.

Sustani et al: "Measurement of the deposit formation during pneumatic transport of PMMA powder", Advanced Powder Technology, vol. 31, p. 3597-3609, Jul. 3, 2020.

* cited by examiner

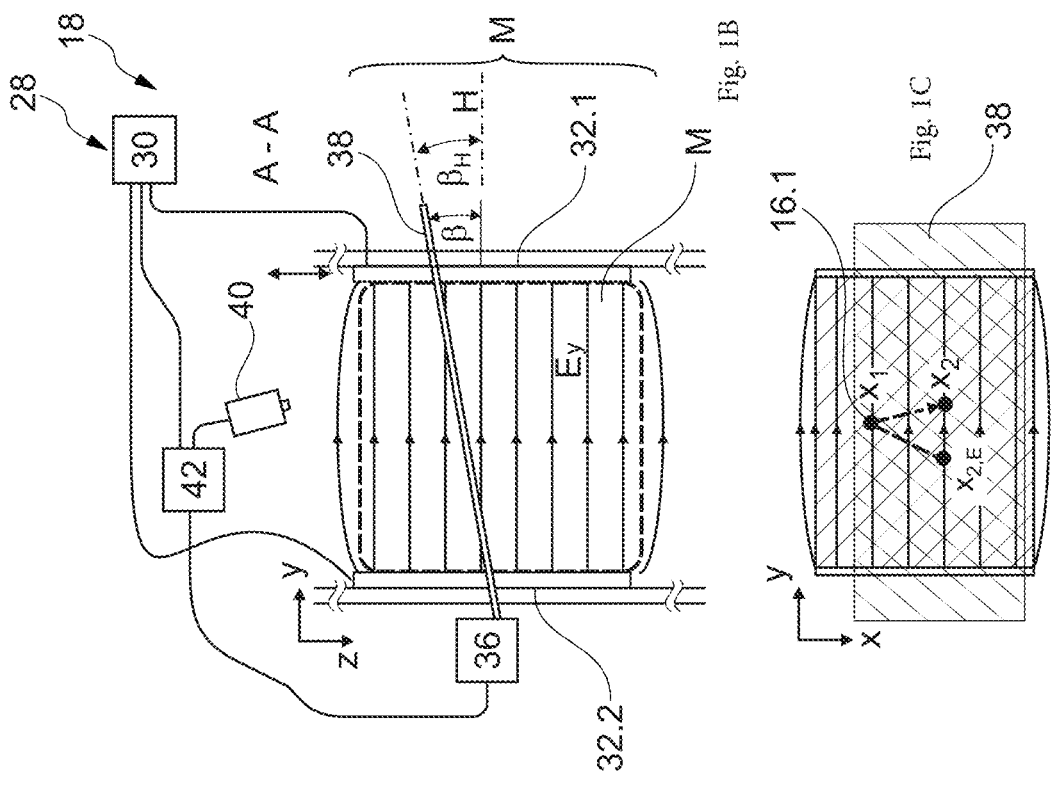
Fig. 1B
Fig. 1C
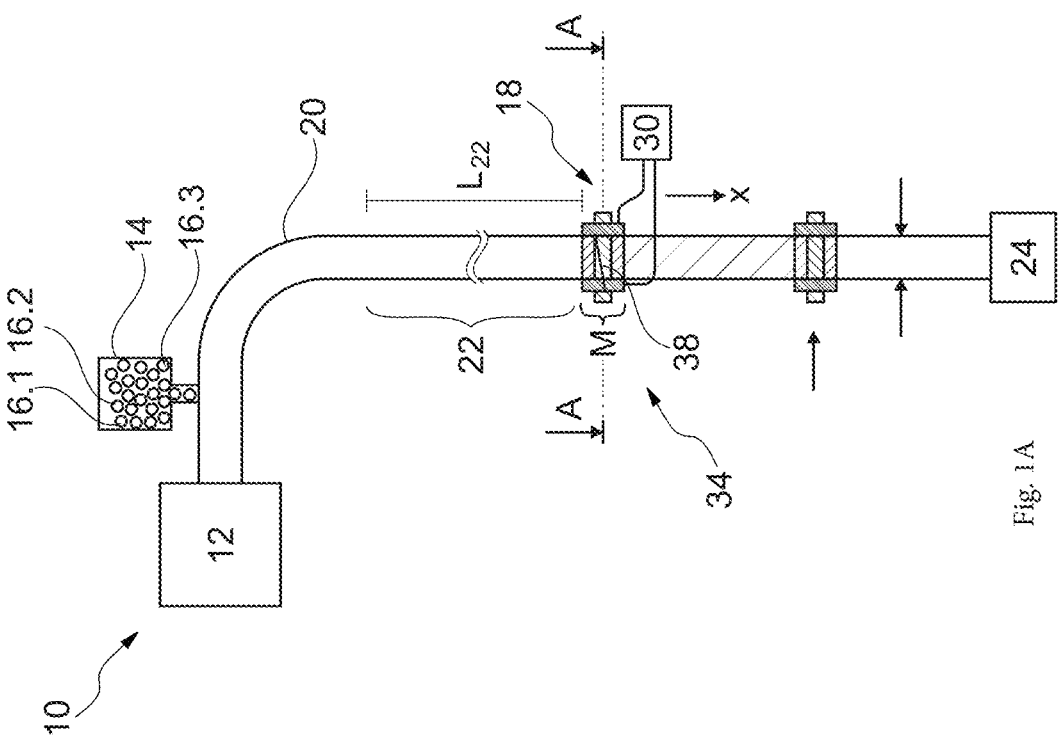
Fig. 1A

METHOD FOR DETERMINING AT LEAST ONE CHARGE CHARACTERISTIC OF ELECTRICAL CHARGES OF PARTICLES IN A FLUID STREAM AND A FLUID STREAM CHARGE MEASURING DEVICE

FIELD OF THE INVENTION

The invention relates to a method for determining at least one charge characteristic of electrical charges in particles in a fluid stream. According to a second aspect, the invention relates to a fluid stream charge measuring device.

BACKGOUND

During the transportation of particles in a fluid stream, such as a gas flow, particularly an air flow, the particles often become electrostatically charged. If this electrostatic charge is too great, a spark discharge may occur. This is especially disadvantageous when an exothermic chemical reaction between the particles and the gas of the gas stream is possible. It may result in an explosion.

The generation of electrostatic charge from particles conveyed by a fluid stream is the subject of intense research but is little understood to date.

To determine a charge characteristic in the form of an overall charge of electrical charges of particles in the fluid stream, so-called Faraday cups are currently used. The particles induce charges on the Faraday cup. Said charges are measured. Such a structure is described in the paper from Susanti and Großhans "Measurement of the deposit formation during pneumatic transport of PMMA powder" in: Advanced powder technology, Vol. 31, 2020, p. 3597-3609.—ISSN 0921-8831. The disadvantage of this measurement procedure is that only the sum of charges is determined, but not the respective positive and negative charge.

A further disadvantage is that the electrostatic charge cannot be measured in a spatially resolved manner.

WO 2014/106078 A2 discloses probes for monitoring electrostatic phenomena in difficult environments, for example in fluidized-bed reactors. These probes comprise a coated or uncoated static probe for measuring the electric field and/or the charge state of the particles; an oscillating electric field probe for measuring the electric field; a probe with a split electric field for measuring the electric field; and a high frequency antenna probe for tracing electrostatic discharging. A modified surface ensures that particles striking the electrode reduce the tribo-electrical charging of the probe.

U.S. Pat. No. 6,049,382 A describes a device and a method for characterizing sprays made up of spherical particles. A laser source generates a collimated laser beam that is guided by the spray to be characterized. The laser beam coincides with the x axis of a Cartesian coordinate system located in a measurement plane perpendicular to the spray axis. 90° scattering generated by the spray material in a small probe volume formed at the intersection of the laser beam and the object volume of the scattering collection means is detected. Additional detection means detect the weakening of the laser beam that passes through the measurement plane. The optical systems are coupled with photo detectors and signal processing units that are able to generate electrical signals proportional to the received light intensities. A transverse device moves the spray in the direction of the laser beam and perpendicular to it to successively obtain a tomographic record of scattering and attenuation activity in points of the spray that form a Cartesian grid within the measurement plane. Concentration measuring means are coupled with the electric output signals of attenuation and scattering to obtain the information about the number density of the spray in the nodes of the tomographic grid system.

U.S. Pat. No. 8,470,151 B2 presents a micro-fluidic pump attachment that utilizes the traveling wave dielectrophoresis (tw-DEP) of microparticles. The flow is generated directly in the micro-fluidic objects by inducing electromechanical effects in the fluid by way of micro-electrodes. The fluidic drive mechanisms due to the particle/fluid and particle/particle interactions under traveling wave dielectrophoresis are analyzed and the induced flow field is obtained from numerical simulations.

EP 3 431 264 B1 describes a 3D printer that comprises an optical determination device by means of which a parameter for characterizing the flow properties of the gas flow flowing through the process chamber is determined. The optical determination device has an optical measurement unit for optically measuring a measured value within the process chamber, the measured value being related to the gas flow. An evaluation unit determines the at least one parameter from the measured value. The measured values are measured at various points within the process chamber. The particle flow is therefore controlled effectively during printing. In the paper from Großhans et al, "Exploring the mechanism of inter-particle charge diffusion." in: The European physical journal: applied physics, Vol. 82, 2018, No. 1, Art. 11101 (9 8.), ISSN 1286-0042, a numerical-mathematical model for inter-particulate charge transfer is presented.

SUMMARY

The invention aims to reduce disadvantages of the prior art.

The invention solves the problem by way of a method for determining at least one charge characteristic of electrical charges of particles in a fluid stream, comprising the steps: (a) directing the fluid stream, which contains particles, through a fluid line, (b) spatially-resolved determination of a measuring field-less particle velocity in a measurement area without an electrical measuring field, (c) applying an electrical measuring field transverse to the flow direction in the measurement area, (d) spatially-resolved determination of a midfield particle velocity in the measurement area and (e) determining the at least one charge characteristic, which denotes an electrostatic charge of the particles, from the spatially-resolved particle velocities.

According to a second aspect, the invention solves the problem by way of a fluid stream charge measuring device with (a) a fluid line, (b) a measuring field generator for generating an electrical measuring field in a measurement area of the fluid line, (c) a particle velocity measure that is designed to automatically determine a spatially-resolved particle velocity distribution by means of particle image velocimetry, and (d) an evaluation unit designed to automatically carry out a method comprising the steps: (i) measuring a spatially-resolved measuring field-less particle velocity by means of the particle image velocimetry measurement unit without the measuring field generator generating an electrical measuring field, (ii) generating the electrical measuring field by means of the measuring field generator and (iii) measuring a spatially-resolved midfield particle velocity by means of the particle image velocimetry measurement unit and (iv) determining at least one charge characteristic, which denotes an electrostatic charge of the particles, from the spatially-resolved particle velocities.

The advantage of the invention is that spatially-resolved information about the charge distribution in the fluid stream is obtained. Unlike with methods according to the prior art, it is possible to detect any existing areas of positive charge and negative charge. Methods that use a Faraday cup only determine the overall charge. Electrostatic fields that may be present between areas of the fluid stream and/or between particles can be detected with the method according to the invention, but not with methods according to the prior art.

It is beneficial that a risk of explosion can usually be detected much more effectively, since the conditions for ignition sparks, namely too large an electrostatic field, which is present independently of the possibly applied electrical measuring field, can be determined with greater certainty.

It is also beneficial that the charge characteristic can be measured in a contactless manner. As a result, the measurement has no notable influence on the fluid stream and/or the particles. In particular, preferably no partial flow is decoupled from the fluid stream for measuring the charge characteristic.

It is therefore beneficial to measure the charge characteristic without particle loss. In other words, it is not necessary to remove particles, at least temporarily, from the fluid stream in order to determine the charge characteristic.

Within the context of the present description, the electrical measuring field is preferably understood to mean an at least largely homogenous measuring field. An at least largely homogenous measuring field is understood particularly to mean that the measuring field can indeed be inhomogenous, but this inhomogeneity is so weak that it increases the measurement uncertainty when determining the charge characteristic by at most 5%. However, an inhomogenous measuring field can also be used.

The spatially resolved determination of particle velocity is understood particularly to mean that the particle velocity is determined as a function of at least one spatial coordinate. In particular, this spatial coordinate extends transversely to a flow direction of the fluid stream.

The particle velocities are preferably determined in terms of at least two spatial coordinates. In particular, the determination of the particle velocities includes a particle velocity component transverse to the flow direction and/or along the flow direction. It is possible, but not necessary, that the particle velocity is known in all three spatial coordinates. Furthermore, it is possible, but not necessary, that the particle velocities are known as a function of two or three spatial coordinates; however, it is generally sufficient if the particle velocities are known as a function of one spatial coordinate.

The characteristic that the measuring field is applied transversely to the flow direction is understood especially to mean that it is possible, but not necessary, that the electrical measuring field is applied perpendicular to the flow direction in the mathematical sense. The flow direction is understood as the macroscopic flow direction of the fluid stream. If the fluid line in the measurement area is prism-shaped, as intended according to a preferred embodiment, i.e. it is not, for example, a curved tube, the flow direction corresponds to the longitudinal direction of the fluid line.

The characteristic that at least one charge characteristic is determined is understood particularly to mean that it is possible, but not necessary, that precisely one charge characteristic is detected. For example, this charge characteristic may be a maximum value of the charge density. Alternatively or additionally, it may refer to the value of the maximum gradient.

The determination of the particle velocity is understood especially to mean the determination of time-average values. The time-average values preferably refer to an averaging time between one second and one minute.

A diameter is understood as the Sauter mean diameter according to DIN ISO 9276.

However, it is especially beneficial if the determination of the at least one charge characteristic is the determination of a plurality of charge characteristics. In particular, the charge characteristics are functional values of a spatially-resolved charge distribution. The charge distribution assigns the charge density to at least one spatial coordinate transverse to the flow direction, or a variable from which the charge density can be determined. The charge density is given in charge per volume unit or charge per surface unit.

Alternatively or additionally, the determination of the at least one charge characteristic is a determination of at least one charge gradient. The charge gradient is obtained by deriving the charge distribution. The charge gradient can be used to determine the locally present electric field that occurs due to the electrostatic charging of the particles.

The fluid is preferably a gas, especially air. Preferably, the fluid stream, which contains particles, can be ignited by electric sparks. This is understood particularly to mean that a spark may trigger a chemical reaction between the particles and at least one component of the fluid stream or between components of the fluid stream. In this case it is especially important to ensure that the electrostatic charge does not become too strong.

According to a preferred embodiment, the measuring field-less particle velocity is determined by means of particle image velocimetry. Alternatively or additionally, the measuring field-less particle velocity is determined by means of laser Doppler anemometry. Alternatively or additionally, the spatially-resolved determination of the midfield particle velocity is preferably determined by means of particle image velocimetry and/or by means of laser Doppler anemometry. These measurement methods enable comparatively high measurement speeds, spatial resolutions and low measurement uncertainties.

The spatially resolved determination comprises the following steps: (a) of the measuring field-less particle velocity: (i) recording a first measuring field-less image of a plurality of particles at a first point in time, (ii) recording a second measuring field-less image of the particles at a second point in time that is later by a time offset, (iii) determining the measuring field-less particle velocity from the measuring field-less images and (b) the midfield particle velocity: (i) recording a first midfield image of a plurality of particles at a third point in time, (ii) recording a second image of the particles at a fourth point in time that is later by a time offset, in particular the same time offset, (iii) determining the midfield particle velocity from the midfield images.

When the images are being recorded, the particles in the fluid stream are preferably irradiated with a light sheet, which is preferably generated by means of a laser. As a result, the positions of the particles detected by the light sheet are determined. The images are preferably captured with a camera that extends transversely to the flow direction in the optical axis. The optical axis thus preferably extends at least largely perpendicular to the light sheet.

Preferably, an angle $\beta_H$ between the light sheet and a horizontal is at most 22°, especially at most 15°. In this case the gravitational force is insignificant.

It is beneficial if the time offset is at most three seconds, especially at most one second, preferably at most 0.5 seconds. Alternatively or additionally, it is beneficial if the time offset is selected in such a way that the particles between the first point in time and the second point in time have advanced by at most 30 millimeters, especially at most 15 millimeters. In each case, these are mean values.

It is possible that the number of particles by means of which the midfield particle velocity is determined differs from the number of particles by means of which the midfield particle velocity and the measuring field-less particle velocity are determined by at most 30%. However, the measuring field-less particle velocity and the midfield particle velocity are usually determined at least predominantly on different particles.

It is beneficial if the spatially-resolved determination of the measuring field-less particle velocity comprises the following steps: (i) in a first time period, recording a measuring field-less image of a plurality of particles irradiated by a light sheet, the light sheet extending along the flow direction of the fluid stream, (ii) in the first time period, altering a property of light, particularly a brightness or color of the light sheet and (iii) determining the measuring field-less particle velocity from the measuring field-less image. Alternatively or additionally, the spatially-resolved determination of the midfield particle velocity comprises the following steps: (i) in a second time period, recording a second midfield image of a plurality of particles irradiated by a light sheet, (ii) in the second time period, altering a property of light, particularly a brightness or color of the light sheet and (iii) determining the midfield particle velocity from the midfield image.

To be able to distinguish between the influence of the application of the electrical measuring field and the influence of turbulences on the particles, the method preferably includes the steps: (a) adding tracer particles to the fluid stream, (b) determining an air velocity of the fluid stream by means of particle image velocimetry and (c) determining the charge characteristic from the spatially-resolved air velocity, the measuring field-less particle velocity and the midfield particle velocity (with and without an electric field). These steps are preferably carried out at least when the Reynolds number has changed by more than 10%, especially at least 20%.

The method is preferably performed on particles with a diameter of at least 10 micrometers. Their diameter is preferably at most 500 micrometers. A diameter of the tracer particles is preferably smaller than the diameter of the particles; in particular, it is preferably at most one fifth of the diameter of the particles. It is beneficial if tracer particles have a diameter of at least 1 micrometer and/or at most 10 micrometers.

It is beneficial if the at least one charge characteristic is a spatially-resolved charge distribution.

The method preferably includes the emission of a warning when the at least one charge characteristic lies outside of a target charge characteristic interval. For example, the target charge characteristic interval is an interval in which a maximum charge distribution lies. If at least one of the charge characteristics lies outside of the target charge characteristic interval, this indicates that the electrostatic charge of the particles in the fluid stream has become too great.

The at least one charge characteristic is preferably determined from the spatially-resolved particle velocities, which is done using the formula $$Q(y, z) = \frac{\pi \rho C_d r^2}{2E \cdot \cos\beta} [|\overline{u}_\beta - \overline{v}_{\beta,E}| (\overline{u}_\beta - \overline{v}_{\beta,E}) - |\overline{u}_\beta - \overline{v}_\beta| (\overline{u}_\beta - \overline{v}_\beta)]$$

6 with

ρ the air density,

β the angle between the electrical measuring field lines and the light sheet, $C_d$ the flow resistance coefficient, r the Sauter mean diameter of the particles according to DIN ISO 9276, $\overline{u}_\beta$ the velocity components of the fluid stream in the light sheet transverse to the flow direction, $\overline{v}_\beta$ the velocity components of the particles in the light sheet transverse to the flow direction without an electrical measuring field and $\overline{v}_{\beta,E}$ the velocity components of the particles in the light sheet transverse to the flow direction with an applied electrical measuring field.

The derivation of this formula is given below. The characteristic that the at least one charge characteristic is determined using the given formula is understood particularly to mean that a calculation is conducted, the result of which deviates from the result that would have been achieved with the given formula by a maximum of 10%, particularly a maximum of 5%. In other words, it is irrelevant whether the formula is implemented, i.e. used, directly in the calculation. It is only relevant that the measurement results are calculated in such a way that they at least largely correspond to the result obtained using the given formula.

Alternatively or additionally, the at least one charge characteristic is determined from the spatially-resolved particle velocities using the formula $$Q(y, z) = \pi \rho C_d r^2 |\overline{u}_\beta - \overline{v}_\beta + \overline{v}_{\beta,E}| \frac{\overline{u}_\beta - \overline{v}_\beta + \overline{v}_{\beta,E}}{2E \cdot \cos\beta}.$$

The method is preferably carried out on a turbulent fluid stream. To date, it has not been possible to conclusively measure a charge characteristic on turbulent fluid streams.

It is beneficial if the fluid stream extends at least largely vertically. This is understood particularly to mean that an angle between the vector of the flow velocity and the vertical is at most 25°, particularly at most 15°.

The method preferably comprises the steps (a) changing a position of the light sheet relative to the fluid line and (b) determining the at least one charge characteristic from the spatially-resolved particle velocities. It is beneficial if the at least one charge characteristic is detected for a plurality of different positions of the light sheet.

A fluid stream charge measuring device according to the invention is preferably designed to automatically emit a warning signal when the charge characteristic lies outside of the target charge characteristic interval. For example, the emission of a warning signal can be the emission of an acoustic, optical, electrical or electromagnetic signal. Preferably, the warning signal is an electronic signal that encodes the message that the charge characteristic lies outside of the target charge characteristic interval. It is beneficial if the fluid stream charge measuring device is designed to emit this warning via a bus system.

The invention also includes a pneumatic conveyor for transporting particles by means of a fluid stream with (a) a fluid stream generator, in particular a fan or a compressor, for generating the fluid stream, especially a gas flow, (b) a fluid stream charge measuring device according to the invention. Preferably, the pneumatic conveyor has a particle feed for feeding particles to the fluid stream. With such a pneumatic conveyor, the fluid stream charge measuring device according to the invention means that damage caused by the particles having too strong an electrostatic charge can be significantly reduced.

DESCRIPTION OF THE DRAWINGS

In the following, the invention will be explained in more detail with the aid of the accompanying drawings. They show:

FIGS. 1A, 1B, and 1C in the partial FIG. 1A, a schematic side view of a pneumatic conveyor according to the invention with a fluid stream charge measuring device according to the invention for carrying out a method according to the invention; in partial FIG. 1B a cross-section A-A; and in partial FIG. 1C an enlargement of the area B according to FIG. 1A.

DETAILED DESCRIPTION

FIG. 1A depicts a pneumatic conveyor 10 according to the invention with a fluid stream generator 12 in the form of a fan for generating a fluid stream, a particle feed 14 for feeding schematically depicted particles $16.i$ and a fluid stream charge measuring device 18 according to the invention.

In the present case, the fluid stream generator 12 is a fan for generating a fluid stream in the form of a compressed air flow with a pressure of p=300 kPa, for example. The particles may be particles of food items, for example, such as tea, coffee or flour.

The fluid stream flows through a fluid line 20. It is beneficial if the fluid line 20 comprises a turbulence formation section 22, the length $L_{22}$ of which is preferably at least 2 meters, particularly at least 3 meters. The length $L_{22}$ is preferably at most 100 meters. A turbulent flow of the fluid stream forms the turbulence formation section 22, wherein the degree of turbulence of said flow no longer changes in the rear section in flow direction S. It is beneficial if the length $L_{22}$ is at least ten times a diameter of the fluid line 20.

The fluid stream charge measuring device 18 is arranged downstream of the turbulence formation section 22 in the flow direction S. A particle sink 24 is schematically arranged downstream of the fluid stream charge measuring device 18 in the flow direction S. The particle sink 24 may refer, for example, to a store for the particles $16.i$. Alternatively, however, the particle sink may also refer to a machine for further processing the particles, for example packing, reforming, pressing or similar.

It is beneficial and, independently of the characteristics otherwise specified for the embodiment, represents a preferred embodiment that the fluid line 20 has the same cross-section in the turbulence formation section 22 and a measuring section 26. Here, they are the same in the technical sense, meaning that it is possible that the cross-sections and/or cross-sectional shapes of the fluid line 20 may change, but this change is so small that the measurement uncertainty when measuring a charge characteristic K to be measured leads to a measurement uncertainty of at most 10%.

FIG. 1B shows a cross-section A-A according to FIG. 1A. It should be noted that the fluid stream charge measuring device 18 comprises a measuring field generator 28. The measuring field generator 28 comprises a voltage source 30 as well as electrodes 32.1, 32.2. An electric field E forms between the electrodes 31.1, 32.2 which can be considered, in good approximation, homogeneous. The measuring field generator 28 is configured to generate a field of at least E=1 kV/m. The electric field is preferably smaller than E=2 MV/m.

The electric field lies in a measurement area M. The fluid stream charge measuring device 18 also comprises a particle velocity measure 34 which, in the present case, is formed by a particle image velocimetry measurement unit. The particle image velocimetry measurement unit 34 comprises a laser 36 (see FIG. 1B) for generating a light sheet 38 as well as a camera 40. By means of an evaluation unit 42, images captured by the camera 40 are analyzed and from these a particle velocity distribution v(y,z) is determined. By averaging an averaging time of $\tau_M$, for example, $\tau_M$=60 seconds, an average particle velocity distribution $\bar{v}(y,z)$ is obtained.

A method according to the invention is carried out by initially determining the particle velocity in a spatially-resolved manner, thereby obtaining the particle velocity distribution v(y,z). To this end, for example, two images are recorded, which are referred to as measuring field-less images as no electric field E is applied. The two measuring field-less images are recorded one after the other at a first point in time $t_1$ and $t_2$. The two points in time are spaced apart in terms of time by a time offset $\tau_V$=$t_2$-$t_1$.

Following a waiting time $\tau_W$ after the second point in time $t_2$ the evaluation unit 42 controls the voltage source 30 in such a way that a voltage $U_{38}$ is applied between the electrodes 31.1, 32.2. The waiting time $\tau_W$ is as small as possible and ideally is at most 500 milliseconds.

The camera 40 then captures two midfield images at a third point in time $t_3$ or a fourth point in time $t_4$. A midfield particle velocity $v_E$ is determined on the basis of these images. It should be noted that it is irrelevant whether the midfield particle velocity $v_E$ is determined first and then the measuring field-less particle velocity v or vice-versa.

Alternatively, the particle velocity distribution v(y,z) can also be determined by means of laser Doppler anemometry. A further alternative is to determine the particle velocity distribution v(z,y) by means of single-image particle image velocimetry. With this method, a property of light of the light sheet 38, such as brightness or color, is altered while the respective image is being captured. Trajectories of the particles $16.i$ are then visible on the respective image, i.e. the measuring field-less image and the midfield image, where the change in the property of light encodes the change in time.

FIG. 1C schematically depicts the particle 16.1, which is at position $x_1$ at the point in time $t_1$. The x-coordinate is measured in the flow direction S, and the y-and z-coordinate perpendicular to that, resulting in a right-hand system.

At the point in time $t_2$ the position $x_2$ occurs when no electric field is applied, i.e. when E=0. If the electric field is applied, the position $x_{2,E}$ occurs.

In order to characterize the flow conditions of the fluid stream, only tracer particles are introduced into the fluid stream in a preliminary test, for example by means of the particle feed 14. The tracer particles are significantly smaller than the particles $16.i$, the electrostatic charge of which is to be determined by means of a method according to the invention. It is assumed that the tracer particles are so light that a tracer particle velocity distribution u(y,z) corresponds, in good approximation, to the velocity distribution of the fluid volumes of the fluid stream. It should be noted that the velocities of the tracer particles are denoted with u, but the velocities of the particles $16.i$ with v.

In each case, respective tracer particle velocity distributions $u_{j(y,z)}$ are obtained from a plurality of measurements with the tracer particles. By averaging an averaging time T, an average spatially-resolved tracer particle velocity $\bar{u}(y,z)$ is obtained. The dash indicates the time-average value.

Without an electric field, the aerodynamic force acts on the particles 16.*i*:

$$F_d = \frac{1}{2}\rho C_o \pi r^2 |\overline{u}_\beta - \overline{v}_\beta|(\overline{u}_\beta - \overline{v}_\beta) \tag{1}$$

When the electric field is applied, it results in the following:

$$F_{d,E} = \frac{1}{2}\rho C_D \pi r^2 |\overline{u}_\beta - \overline{v}_{\beta,E}|(\overline{u}_\beta - \overline{v}_{\beta,E}) \tag{2}$$

The following electrostatic force acts on the particles:

$$F_e = QE \cos \beta \tag{3}$$

In the present case, the angle $\beta_H$ between the light sheet 38 and a horizontal is $\beta_H = 22°$. The gravitational force is therefore insignificant.

Forming the difference from equations (1) and (2) results in $$Q(y, z) = \frac{\pi \rho C_d r^2}{2E \cdot \cos\beta}[|\overline{u}_\beta - \overline{v}_{\beta,E}|(\overline{u}_\beta - \overline{v}_{\beta,E}) - |\overline{u}_\beta - \overline{v}_\beta|(\overline{u}_\beta - \overline{v}_\beta)] \tag{4}$$

The straight brackets indicate the absolute value. It thus results in the charge distribution Q(y,z). This charge distribution has a maximum value $Q_{max}$, which represents a charge characteristic K. The charge distribution Q(y,z) also has a gradient field $\nabla Q(y,z)$. This gradient field has a maximum gradient, which is the gradient of maximum value. This also represents a charge characteristic K. All individual functional values of the charge distribution Q(y,z) also represent charge characteristics K.

The project that led to this patent application was funded by the European Research Council under No. 947606 as part of the European Union's Horizon 2020 research and innovation program.

REFERENCE LIST

10 pneumatic conveyor
12 fluid stream generator
14 particle feed
16 particle
18 fluid stream charge measuring device
20 fluid line
22 turbulence formation section
24 particle sink
26 measurement section
28 measuring field generator
30 voltage source
32 electrode
34 particle velocity measure
36 laser
38 light sheet
40 camera
42 evaluation unit
$\tau_W$ waiting time
$\tau_v$ time offset
$\nabla Q(y,z)$ gradient field
E electric field

10

H horizontal
i running index
K charge characteristic
$L_{22}$ length
M measurement area
p fluid pressure
Q(y,z) charge distribution
$Q_{max}$ maximum value of the charge distribution
S flow direction
T averaging time
t time
$U_{38}$ voltage
u(y,z) fluid velocity distribution
$\bar{u}$(y,z) time-averaged fluid velocity distribution
v(y,z) particle velocity distribution
$\bar{v}$(y,z) time-averaged particle velocity distribution
v measuring field-less particle velocity
$v_E$ particle velocity

The invention claimed is:

1. A method for determining at least one charge characteristic of electrical charges of particles in a fluid stream, comprising:
   (a) directing the fluid stream which contains particles through a fluid line;
   (b) performing a first spatially-resolved determination of a measuring field-less particle velocity in a measurement area without an electrical measuring field;
   (c) applying an electrical measuring field transverse to a flow direction in the measurement area;
   (d) performing a second spatially-resolved determination of a midfield particle velocity in the measurement area; and
   (e) determining the at least one charge characteristic which denotes an electrostatic charge of the particles, from the first spatially-resolved determination and the second spatially-resolved determination.

2. The method according to claim 1 wherein the first spatially-resolved determination of the measuring field-less particle velocity and/or the second spatially-resolved determination of the midfield particle velocity occurs by particle image velocimetry.

3. The method according to claim 1 wherein the first spatially-resolved determination of the measuring field-less particle velocity and the second spatially-resolved determination of the midfield particle velocity occurs via laser Doppler anemometry.

4. The method according to claim 1 wherein the first spatially-resolved determination of the measuring field-less particle velocity comprises:
   (i) recording a first measuring field-less image of a plurality of particles at a first point in time,
   (ii) recording a second measuring field-less image of the plurality of particles at a second point in time, wherein the second point in time is later than the first point in time by a first time offset, and
   (iii) determining the measuring field-less particle velocity from the first measuring field-less image and the second measuring field- less image, and
wherein the second spatially-resolved determination of the midfield particle velocity comprises:
   (i) recording a first midfield image of a plurality of particles at a third point in time,
   (ii) recording a second midfield image of the plurality of particles at a fourth point in time, wherein the fourth point in time is later by a second time offset, wherein the first time offset and the second time offset are the same or different, and (iii) determining the midfield particle velocity from the first midfield image and the second midfield image.

5. The method according to claim 1 wherein the spatially-resolved determination of the measuring field-less particle velocity comprises:

(i) in a first time period, recording a measuring field-less image of a plurality of particles irradiated by a light sheet, the light sheet extending along the flow direction of the fluid stream, (ii) in the first time period, altering a property of light of the light sheet, and (iii) determining the measuring field-less particle velocity from the measuring field-less image, and/or wherein the spatially-resolved determination of the midfield particle velocity comprises:

(i) in a second time period, recording a second midfield image of a plurality of particles irradiated by the light sheet, (ii) in the second time period, altering a property of light of the light sheet, and (iii) determining the midfield particle velocity from the midfield image.

6. The method according to claim 5 wherein the property of light is selected from the group consisting of brightness and color.

7. The method according to claim 1, further comprising:

(a) adding tracer particles to the fluid stream, (b) determining a spatially-resolved air velocity of the fluid stream by particle image velocimetry, and (c) determining the at least one charge characteristic from the spatially-resolved air velocity, the measuring field-less particle velocity, and the midfield particle velocity.

8. The method according to claim 1 wherein the at least one charge characteristic is a spatially-resolved charge distribution.

9. The method according to claim 1 further comprising emitting a warning when the at least one charge characteristic lies outside of a target charge characteristic interval.

10. The method according to claim 1 wherein the determination of at least one charge characteristic from the spatially- resolved particle velocities is a determination of the spatially-resolved charge distribution using the following formula:

$$Q(y,z) = \frac{\pi \rho C_d r^2}{2E \cdot \cos\beta}[|\bar{u}_\beta - \bar{v}_{\beta,E}|(\bar{u}_\beta - \bar{v}_{\beta,E}) - |\bar{u}_\beta - \bar{v}_\beta|(\bar{u}_\beta - \bar{v}_\beta)]$$

with
ρ air density,

β angle between electrical measuring field lines and the light sheet, $C_d$ flow resistance coefficient, r Sauter mean diameter of the particles according to DIN ISO 9276, $\bar{u}_\beta$ velocity components of the fluid stream in the light sheet transverse to the flow direction, $\bar{v}_\beta$ velocity components of the particles in the light sheet transverse to the flow direction without an electrical measuring field, and $\bar{v}_{\beta,E}$ velocity components of the particles in the light sheet transverse to the flow direction with an applied electrical measuring field.

11. A fluid stream charge measuring device, comprising:

a fluid line, a measuring field generator for generating an electrical measuring field in a measurement area of the fluid line, a particle image velocity measurement unit configured to automatically determine a spatially-resolved particle velocity distribution by particle image velocimetry, and a controller configured to enable the fluid stream charge measuring device to automatically carry out a method comprising:

(i) measuring a spatially-resolved measuring field-less particle velocity by the particle image velocimetry measurement unit without the measuring field generator generating an electrical measuring field, (ii) generating the electrical measuring field by the measuring field generator, (iii) measuring a spatially-resolved midfield particle velocity by the particle image velocimetry measurement unit, and (iv) determining at least one charge characteristic which denotes an electrostatic charge of the particles from the spatially-resolved particle velocities.

12. The fluid stream charge measuring device according to claim 11, further comprising a warning signal emitter designed to automatically emit a warning signal when the charge characteristic lies outside of the target charge characteristic interval.

13. A pneumatic conveyor for transporting particles in a fluid stream, comprising:

(a) a fluid stream generator for generating the fluid stream, (b) a particle feed for feeding particles to the fluid stream, and (c) a fluid stream charge measuring device according to claim 11.

14. The pneumatic conveyor of claim 13 wherein the fluid stream generator is selected from the group consisting of a fan and a compressor.

* * * * *